United States Patent
Raja et al.

(10) Patent No.: US 11,774,936 B2
(45) Date of Patent: Oct. 3, 2023

(54) STEPPER MOTOR

(71) Applicant: TEXAS INSTRUMENTS INCORPORATED, Dallas, TX (US)

(72) Inventors: Rakesh Raja, Allen, TX (US); Sudhir Nagaraj, Dallas, TX (US); Sooping Saw, McKinney, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/030,683

(22) Filed: Sep. 24, 2020

(65) Prior Publication Data

US 2021/0011451 A1    Jan. 14, 2021

Related U.S. Application Data

(63) Continuation of application No. 16/263,766, filed on Jan. 31, 2019, now Pat. No. 10,824,130.

(51) Int. Cl.
| | |
|---|---|
| *H02P 8/00* | (2006.01) |
| *G05B 19/40* | (2006.01) |
| *H02K 3/04* | (2006.01) |
| *G05D 3/10* | (2006.01) |
| *H02M 7/537* | (2006.01) |

(52) U.S. Cl.
CPC .............. *G05B 19/40* (2013.01); *G05D 3/10* (2013.01); *H02K 3/04* (2013.01); *H02M 7/537* (2013.01)

(58) Field of Classification Search
CPC ............ G05B 19/40; G05D 3/10; H02K 3/04; H02M 7/537
USPC ........................................................ 318/696
See application file for complete search history.

(56) References Cited

U.S. PATENT DOCUMENTS

| | | | |
|---|---|---|---|
| 6,597,147 B2* | 7/2003 | Li ............................ | H02P 8/22 |
| | | | 318/696 |
| 2004/0222779 A1 | 11/2004 | De Cock | |
| 2008/0309274 A1 | 12/2008 | Thomson | |
| 2009/0066278 A1* | 3/2009 | Arisawa .................... | H02P 8/22 |
| | | | 318/400.35 |
| 2009/0153093 A1* | 6/2009 | Pinewski .................. | H02P 8/36 |
| | | | 318/696 |
| 2010/0244887 A1 | 9/2010 | De Cock | |
| 2011/0076006 A1 | 3/2011 | Hirose | |
| 2012/0293106 A1* | 11/2012 | Hirt ........................ | H02P 23/26 |
| | | | 318/722 |
| 2016/0072413 A1 | 3/2016 | Grasblum | |
| 2016/0359437 A1* | 12/2016 | Hijikata .................... | H02P 8/12 |
| 2019/0190415 A1 | 6/2019 | Hijikata | |

* cited by examiner

*Primary Examiner* — Erick D Glass
(74) *Attorney, Agent, or Firm* — John R. Pessetto; Frank D. Cimino

(57) ABSTRACT

A method for electrically producing a stalled state in a stepper motor having a first coil and a second coil is provided. The method includes driving a first sinusoidal current through the first coil, and driving a second sinusoidal current through the second coil, wherein the first and second sinusoidal currents are in phase.

13 Claims, 5 Drawing Sheets

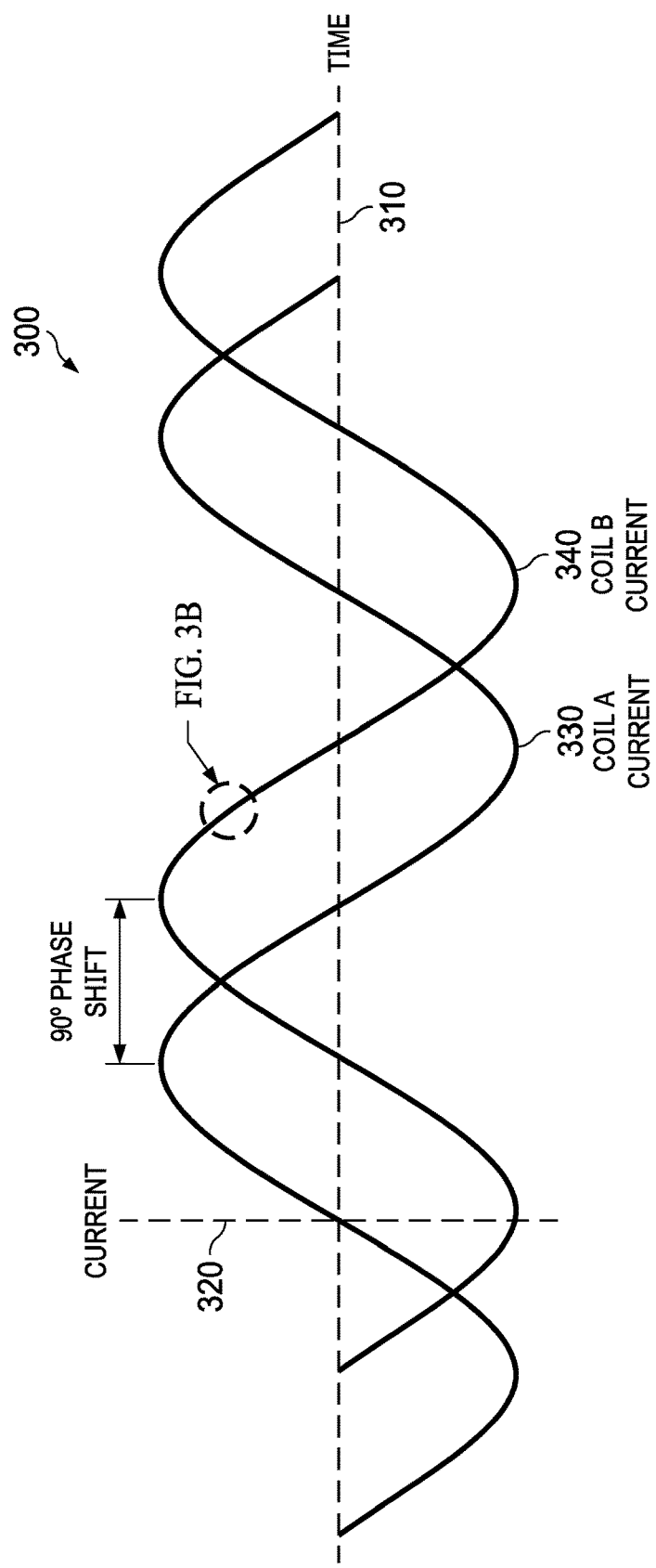
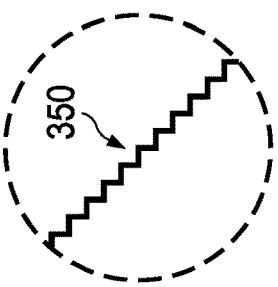
FIG. 3A
FIG. 3B

STEPPER MOTOR

CROSS REFERENCE TO RELATED APPLICATION(S)

This continuation application claims priority to U.S. patent application Ser. No. 16/263,766, filed Jan. 31, 2019, which is incorporated herein by reference in its entirety.

TECHNICAL BACKGROUND

Stepper motors have become ubiquitous in modern systems. They are found in a wide range of electronic and electro-mechanical systems. For example, automated teller machines (ATMs) contain multiple stepper motors to provide functions including card reading, cash dispensing, receipt printing and dispensing, deposit intake, and the like. In order to increase performance stepper motors and their surrounding electro-mechanical systems need to be calibrated while the stepper motors are in a stalled state. This allows the system designer to determine physical and electrical parameters of the stepper motor and the surrounding system while the stepper motor is under normal loaded conditions.

Stepper motors may be placed into a stalled state by physically clamping the stepper motor. However, in many applications it is not physically possible to exert sufficient mechanical force on the stepper motor while it is in use.

Overview

In an implementation, a method for electrically producing a stalled state in a stepper motor having a first coil and a second coil is provided. The method includes driving a first sinusoidal current through the first coil, and driving a second sinusoidal current through the second coil, wherein the first and second sinusoidal currents are in phase.

In another implementation, A motor control circuit for electrically stalling a stepper motor having a first coil and a second coil is provided. The motor control circuit includes power transistor elements in a half-bridge arrangement coupled to first and second terminals of the first and second coils, configured to selectively switch current for the first and second coils of the stepper motor according to control signals applied to corresponding gate terminals.

The motor control circuit also includes control circuitry coupled to the gate terminals of the power transistor elements, configured to produce the control signals to control the power transistor elements, wherein the control signals are configured to cause the power transistor elements to drive a first sinusoidal current through the first coil and a second sinusoidal current through the second coil; wherein the first and second sinusoidal currents are in phase.

BRIEF DESCRIPTION OF THE DRAWINGS

While several implementations are described in connection with these drawings, the disclosure is not limited to the implementations disclosed herein. On the contrary, the intent is to cover all alternatives, modifications, and equivalents.

FIG. 3A illustrates coil currents in a stepper motor in an example implementation.

FIG. 3B illustrates a detail view of coil currents in a stepper motor in an example implementation.

DETAILED DESCRIPTION

Figure 1:
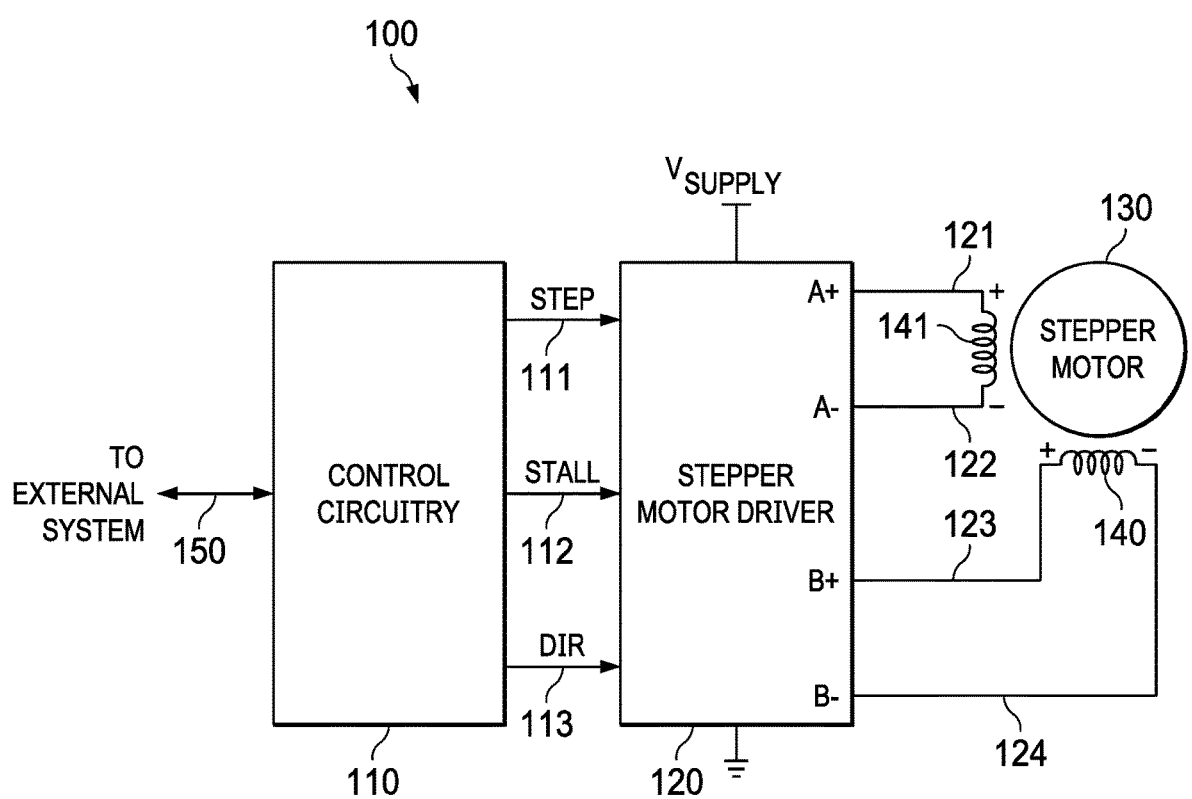
FIG. 1 illustrates a stepper motor system in an example implementation.

Stepper motors are a type of computer-controlled motion-control positioning system. They are typically digitally controlled as part of an open loop (no feedback) system for use in holding and positioning applications.

They are commonly used for positioning within a wide variety of applications. For example, stepper motors are used in disk drives, scanners, computer printers and plotters, camera lenses, CNC machines, 3D printers, and the like. In optical applications they are commonly used in precision positioning equipment such as linear actuators, linear stages, rotation stages, goniometers, mirror mounts, and the like. They are also commonly used in industrial machines such as robotics, assembly machines, packaging machines, electrical and mechanical testing machines, fluid control systems, material alignment systems, and the like.

Stepper motors are brushless direct current (DC) electric motors that divide a full rotation into a number of equal steps. They are configured such that the motor's position can then be directed to move and hold position at any one of these steps without the need for a position sensor for feedback. However, the motor must be sized to the application with respect to torque and speed.

In order to verify that the motor is correctly sized to the application and to properly profile the motor and analyze the system of the application, the stepper motor must be stalled. Stepper motors may be stalled by physically clamping the motor, with sufficient force that the motor is unable to turn regardless of the commands sent to the stepper motor. However, in many applications, such as ATMs, there are a large number of stepper motors in a small physical space, and it is often impossible to physically stall each of the stepper motors.

Two-phase bipolar stepper motors commonly include two electrical coils (electromagnets) configured perpendicular to each other, with a single coil per phase. Sinusoidal currents are induced within these coils by a stepper motor driver. Sinusoidal currents are used instead of square wave currents in order to reduce vibration within the stepper motor. While square wave currents are easier and cheaper to generate, the vibration induced by the square waves precludes the use of square waves in many applications.

In examples, these sinusoidal currents each include a plurality of micro-steps in order to reduce static friction effects. As these micro-steps become smaller, stepper motor operation becomes smoother, thereby greatly reducing resonance in any other electro-mechanical parts the motor is connected to, as well as in the stepper motor itself. Resolution of the micro-steps is limited by the mechanical stiction (static friction), backlash, and other sources of error between the motor and the electro-mechanical parts the motor is connected to. When the electrical coils are perpendicular to each other, and sinusoidal currents that are 90° out of phase with each other are applied to the electrical coils, the stepper motor turns.

Modern hybrid stepper motors are rated such that the travel of each full step (for example, 1.8 degrees per full step or 200 full steps per revolution) will be within 3-5% of the travel of each other full step, as long as the stepper motor is operated within its specified operating ranges.

Stepper motor systems include various electronics to control and monitor operation of the motors. For example, stepper motors employ control electronics to direct current to and from the electrical coils, which might take the form of various circuit topologies. One example topology, the half-bridge power stage topology, is commonly used to drive the electrical coils within stepper motors. These half-bridge topologies can include H-bridge, triple half-bridge, and dual H-bridge types, among others.

In examples, the control electronics is divided into a stepper motor driver and control circuitry. The stepper motor driver includes high-power electrical elements configured in a half-bridge power stage topology, while the control circuitry contains low-power circuitry configured to process commands into various signals used to control the high-power electrical elements.

Stepper motor performance is very dependent on the control circuitry. Torque curves (the torque applied to the rotating part of the motor during a cycle) may be extended to greater speeds if the voltages applied to the poles of the coils can be alternated more quickly. However, inductances of the coils resist quick changes to the voltages applied to the coils. In order to overcome these inductances and quickly switch the coils, a larger voltage is applied to the coils, and then however, the current produced by these large voltages must be reduced.

Further limiting the potential speed of the motor is the back-EMF (electromagnetic field) of the motor. This back-EMF may be comparable to the effects of inductance discussed above in limiting the speed of the stepper motor. As the stepper motor turns, a sinusoidal voltage proportional to the speed of the motor is generated. This alternating current (AC) voltage reduces the voltage available to induce a change in the current within the coils.

In various implementations described herein, a stall condition is electrically created within a stepper motor in order to obtain a reference profile of the driving sinusoidal current waveform with out the effect of back-EMF. In an example, a stall state is produced in a stepper motor by driving the two stepper motor coils with in-phase sinusoidal current. When the sinusoidal currents through the two stepper motor coils are in-phase, e.g. the current through the two coils is the same in each micro-step, the stepper motor does not move.

This allows the stepper motor to be driven with the same current profile as the motor has while running, but does not move the motor or create back-EMF. This stalled state of the motor mimics a mechanical stall of the motor and provides the control circuitry with an opportunity to determine the electrical characteristics of the stalled motor.

This method of producing a stalled state in a stepper motor does not require physical access to the stepper motor and provides an opportunity to stall even large loads that are difficult to be stalled mechanically.

This method also creates a reliable and repeatable stall state compared to mechanical stalling, which has a large dependency on how the motor is stalled, e.g. hard or soft stall, or how quickly the motor is stopped. This method also allows for real-time calibration of the electro-mechanical system at power-up in the field based on system conditions such as supply voltage, temperature, and the like.

Stepper motor control systems are discussed herein, which can be employed to control stepper motors, among other elements. Depending on the type of stepper motor and configuration, two or more coils might be provided within a stepper motor. Coils are employed in stepper motors to provide rotary motion, and these may be built from wire. Control systems control distribution of electrical current to and from the coils.

One example control circuit topology, a half-bridge power stage, includes control circuitry as well as power switching elements. These power switching elements can include metal oxide semiconductor field-effect transistor (MOSFETs), insulated-gate bipolar transistors (IGBTs), or thyristors, among other switching elements. Although the motor control circuitry discussed herein employs power MOSFETs, the control circuitry can be applied to control other types of switching elements.

As a first example of enhanced stepper motor control circuitry, FIG. 1 is provided. FIG. 1 illustrates stepper motor system 100 which provides power to two coils 140 and 141 of stepper motor 130. System 100 includes control circuitry 110, stepper motor driver 120, and stepper motor 130. Control circuitry 110 can communicate over link 150 with one or more external systems, such as to provide a programming interface for elements of stepper motor system 100. In operation, control circuitry 110 instructs stepper motor driver 120 over one or more links 111, 112, and 113 to produce sinusoidal current for coils 140 and 141.

In this example, control circuitry 110 provides three control signals to stepper motor driver 120. STEP 111 instructs stepper motor driver 120 to apply current to coils 140 and 141 such that stepper motor 130 advances one step. DIR 113 directs stepper motor driver 120 to control the direction in which stepper motor 130 steps. STALL 112 directs stepper motor driver 120 to apply in-phase (or the same) sinusoidal currents to coils 140 and 141 in order to produce a stalled state in stepper motor 130.

In this example, stepper motor driver 120 includes four terminals used to source and sink current to coils 140 and 141. In many implementations, coils 140 and 141 are positioned within stepper motor 130. They are shown here separate from stepper motor 130 for illustrative purposes. Terminals A+ 121 and A− 122 are coupled to the positive and negative terminals of coil 141 respectively. Terminals B+ 123 and B− 124 are coupled to the positive and negative terminals of coil 140 respectively. Stepper motor driver 120 receives power from $V_{SUPPLY}$ and includes a connection to a reference voltage (or ground).

Control circuitry 110 includes one or more processing elements and control circuits to instruct stepper motor driver 120 to selectively source or sink current from coils 140 and 141 through terminals 121-124.

In the illustrated example, control circuitry 110 and stepper motor driver 120 are configured as modules connected through control lines 111-113. Other alternatives may partition the various functions of control circuitry 110 and stepper motor driver 120 differently, all within the scope of the present invention. For example, an implementation may include all low-power circuitry within control circuitry 110 and leave only the high-power driver elements within stepper motor driver 120. In such an example, control circuitry 110 produces control signals which couple to gate terminals of the driver elements within stepper motor driver 120.

Control circuitry 110 can be implemented using various microprocessors, control logic, programmable logic devices, discrete logic devices, or other devices and elements. Control circuitry 110 can also include gate driver circuitry which drives the gate terminals of the power transistor elements. This driver circuitry can include power amplifiers, gate drive transformers, DC-DC converter elements, or other circuit components to provide sufficient voltages to control gate terminals of associated power transistor elements.

Stepper motor driver 120 includes power transistor elements which act as power switching elements with regard to stepper motor coils 140 and 141. Switching elements of power circuitry 120 are coupled between a voltage source, indicated in FIG. 1 as $V_{SUPPLY}$, and a reference potential (or ground). Although various transistor circuit topologies might be employed by stepper motor driver 120, the examples herein include half-bridge topologies.

Half-bridge power stage topologies can be used to control different motor types, such as DC motors. These half-bridge topologies can include H-bridge, triple half-bridge, and dual H-bridge types, among others. A half-bridge power stage includes two switching elements, such as power transistors, arranged to have a first (high-side) switching element and a second (low-side) switching element coupled at a common output node.

This common output node is shown as terminals 121-124 in FIG. 1, although various passive circuit elements might be positioned between the common output node and terminals 121-124. The high-side switching element also couples to the voltage source, while the low-side switching element also couples to the reference potential (or ground).

In the examples herein, the switching elements include power metal oxide semiconductor field-effect transistor (MOSFETs). Specifically, n-channel power MOSFETs are employed due to the lower on-resistance than p-channel power MOSFETS. Power MOSFETs include gate terminals, drain terminals, and source terminals for connection to external components. Additionally, power MOSFETs include "body diode" components which result from the structural formation of semiconductor connections internal to each power MOSFET. These body diode components or elements might continue to conduct current after a corresponding power MOSFET has been switched into an 'off' or inactive state.

Half-bridge power stage topologies employ high-side and low-side power MOSFET devices. A first (high-side power) MOSFET is coupled at a drain terminal to the voltage source ($V_{SUPPLY}$), while a source terminal is coupled to a common output node. A second (low-side) power MOSFET is coupled at a source terminal to the reference potential (e.g. electrical ground), while a drain terminal is coupled to the common output node. Gate terminals of the first MOSFET and second MOSFET are coupled via one or more links to gate driver elements of control circuitry 110.

The first and second MOSFETs are configured to selectively switch current for the first and second coils according to control signals applied to corresponding gate terminals of the power transistor elements by control circuitry 110. Various passive or active circuit components might be provided in stepper motor driver 120 to support operation of the power MOSFETs, such as resistors, capacitors, inductors, voltage limiters, diodes, logic gates, or other elements.

Figure 2:
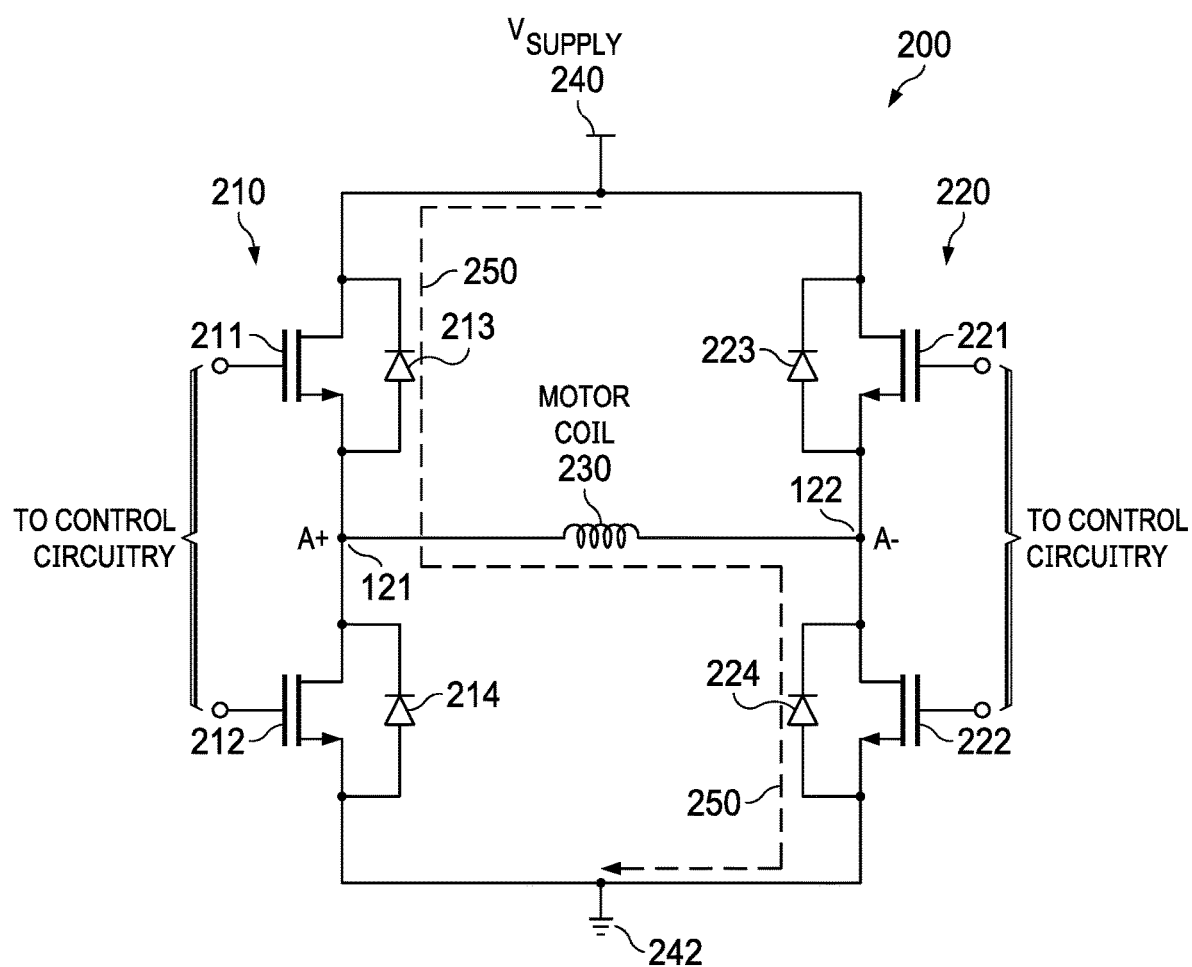
FIG. 2 illustrates a stepper motor power control system in an example implementation.

Turning now to a specific implementation of stepper motor driver 120, FIG. 2 is presented. FIG. 2 includes power switching circuit 200 as an example of a portion stepper motor driver 120, although variations are possible. Power switching circuit 200 includes two half-bridge topologies 210 and 220 each formed by two power MOSFET devices. Half-bridge 210 is formed by MOSFET devices 211 and 212 including their body diodes 213 and 214 respectively. Half-bridge 220 is formed by MOSFET devices 221 and 222 including their body diodes 223 and 224 respectively. In this example, power switching circuit 200 is provided power from $V_{SUPPLY}$ 240 and node 242 provides a reference potential (or ground).

MOSFET device 211 is the "high-side" (HS) device of half-bridge 210, while MOSFET device 212 is the "low-side" (LS) device of half-bridge 210. Each power MOSFET device also has a corresponding body diode 213 and 214. MOSFET device 211 is coupled at a drain terminal to a voltage source, referred to as $V_{SUPPLY}$ 240. MOSFET device 211 is coupled at a gate terminal to control circuitry not illustrated here for simplicity. MOSFET device 211 is coupled at a source terminal to a drain terminal of MOSFET device 212, which is also terminal A+ 121 of stepper motor driver 120 of FIG. 1. Terminal A+ 121 is coupled to a positive terminal of motor coil 230 (coil 141 as illustrated in FIG. 1). MOSFET device 212 is coupled at a gate terminal to control circuitry not illustrated here for simplicity, and at a source terminal to a voltage reference (electrical ground) 242.

MOSFET device 221 is the "high-side" (HS) device of half-bridge 220, while MOSFET device 222 is the "low-side" (LS) device of half-bridge 220. Each power MOSFET device also has a corresponding body diode 223 and 224. MOSFET device 221 is coupled at a drain terminal to a voltage source, referred to as $V_{SUPPLY}$ 240. MOSFET device 221 is coupled at a gate terminal to control circuitry not illustrated here for simplicity. MOSFET device 221 is coupled at a source terminal to a drain terminal of MOSFET device 222, which is also terminal A− 122 of stepper motor driver 120 of FIG. 1. Terminal A− 122 is coupled to a negative terminal of motor coil 230 (coil 141 as illustrated in FIG. 1). MOSFET device 222 is coupled at a gate terminal to control circuitry not illustrated here for simplicity, and at a source terminal to a voltage reference (electrical ground) 242.

In operation, the half-bridge arrangement provides power to motor coil 230 in the form of electrical current. This electrical current has two polarities, namely a positive and negative polarity indicated. A positive current polarity is referred to in FIG. 2 as an outgoing current from half-bridge 210 to motor coil 230, while a negative current polarity is referred to in FIG. 2 as an outgoing current from half-bridge 220 to motor coil 230. Various switch states among MOSFET devices 211, 212, 221, and 221 provide for sinking or sourcing the motor winding current and associated polarities. For example, when MOSFET 211 of half-bridge 210 is active, then current is supplied from $V_{SUPPLY}$ through MOSFET 211 to motor coil 230. Likewise, when MOSFET 212 of half-bridge 210 is active, the current is drawn to ground through MOSFET 212.

In this example embodiment, a positive drive current flow is illustrated by dashed line 250. Here, MOSFET 211 of half-bridge 210 is active, and MOSFET 222 of half-bridge 220 is active, causing current to flow through motor coil 230. In normal operation, sinusoidal currents are applied to motor coil 230. These sinusoidal currents include a plurality of micro-steps.

FIG. 3A illustrates coil currents in a stepper motor in an example implementation. In this example of a stepper motor in normal operation 300, coil A current 330 and coil B current 340 are plotted on a horizontal time axis 310 and a vertical current axis 320. Note that in this example, there is a 90° phase shift between the sinusoidal coil A current 330 and the sinusoidal coil B current 340, causing the stepper motor to rotate.

FIG. 3B illustrates a detail view of coil currents in a stepper motor in an example implementation. In this example, these sinusoidal currents are made up of many micro-steps 350, in order to reduce static friction effects.

Referring back to FIG. 1, in this example, stepper motor 130 includes coil A 141 and coil B 140 which are perpendicular to each other. Stepper motor driver 120 includes power transistor elements in a half-bridge arrangement coupled to the A+ 121 and A− 122 terminals of coil A 141 and the B+ 123 and B− 124 terminals of coil B. Stepper motor driver 120 is configured to selectively switch current for coil A 141 and coil B 140 of stepper motor 130 according to control signals from control circuitry 110 applied to corresponding gate terminals of the power transistor elements.

Control circuitry 110 is coupled to the gate terminals of the power transistor elements, configured to produce the control signals to control the power transistor elements within stepper motor driver 120. The control signals are configured to cause the power transistor elements within stepper motor driver 120 to drive a first sinusoidal current through coil A 141 and a second sinusoidal current through coil B 140. In this example the first and second sinusoidal currents are 90° out of phase and stepper motor 130 turns.

Figure 4:
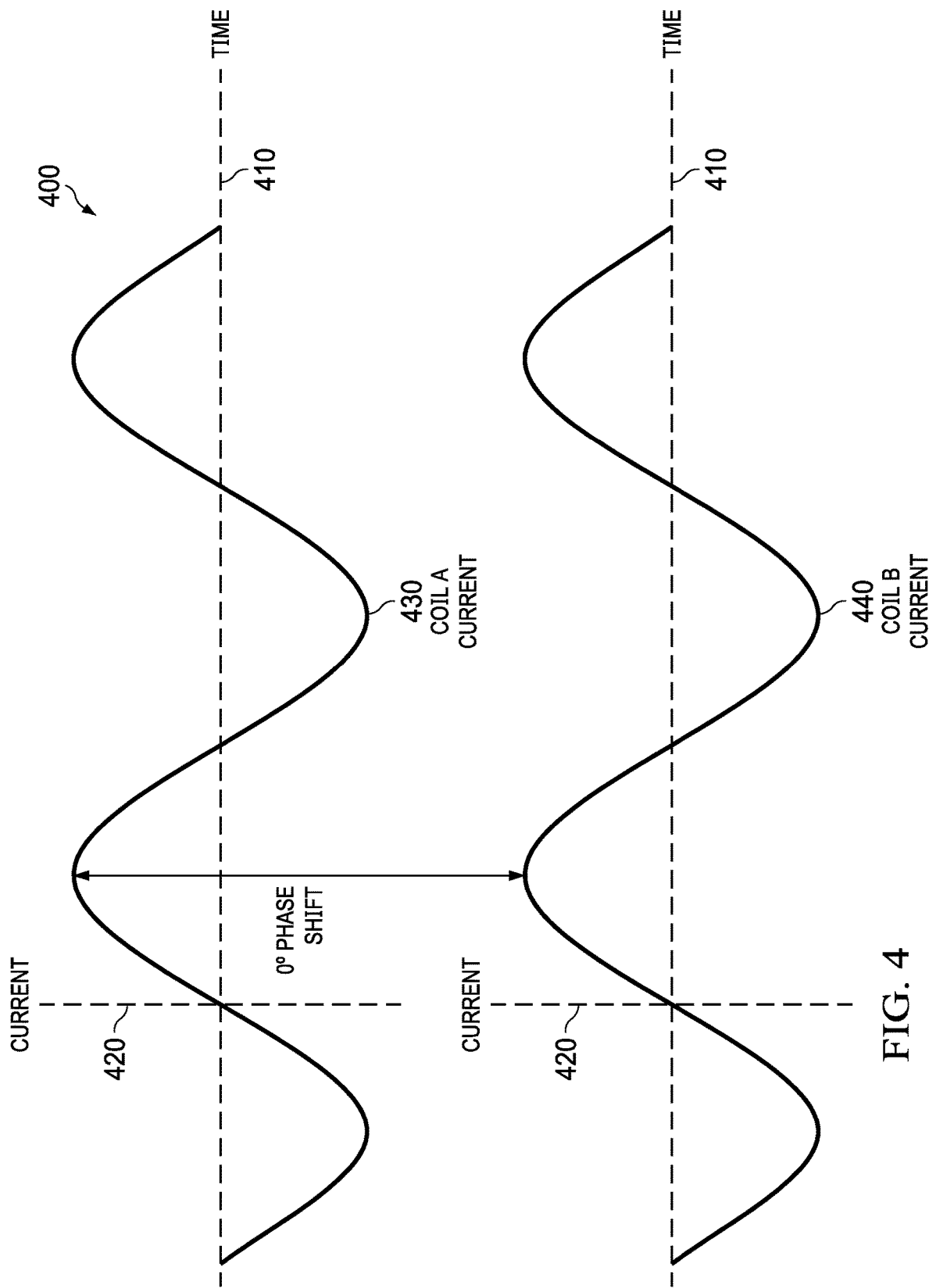
FIG. 4 illustrates coil currents in a stepper motor in an electrically stalled state in an implementation.

FIG. 4 illustrates coil currents in a stepper motor in an electrically stalled state in an implementation. In this example of a stepper motor in an electrically stalled state 400, coil A current 430 and coil B current 440 are plotted on horizontal time axes 410 and vertical current axes 420. Here, the sinusoidal coil A current 430 and sinusoidal coil B current 440 are in-phase (e.g. they have a 0° phase shift), causing the stepper motor to be in an electrically stalled state. Also note that in this example, these sinusoidal currents are made up of many micro-steps, in order to reduce static friction effects.

Referring back to FIG. 1, in this example, stepper motor 130 includes coil A 141 and coil B 140 which are perpendicular to each other. Stepper motor driver 120 includes power transistor elements in a half-bridge arrangement coupled to the A+ 121 and A− 122 terminals of coil A 141 and the B+ 123 and B− 124 terminals of coil B. Stepper motor driver 120 is configured to selectively switch current for coil A 141 and coil B 140 of stepper motor 130 according to control signals from control circuitry 110 applied to corresponding gate terminals of the power transistor elements.

Control circuitry 110 is coupled to the gate terminals of the power transistor elements, configured to produce the control signals to control the power transistor elements within stepper motor driver 120. The control signals are configured to cause the power transistor elements within stepper motor driver 120 to drive a first sinusoidal current through coil A 141 and a second sinusoidal current through coil B 140. In this example the first and second sinusoidal currents are in phase and stepper motor 130 is in a stalled state.

Figure 5:
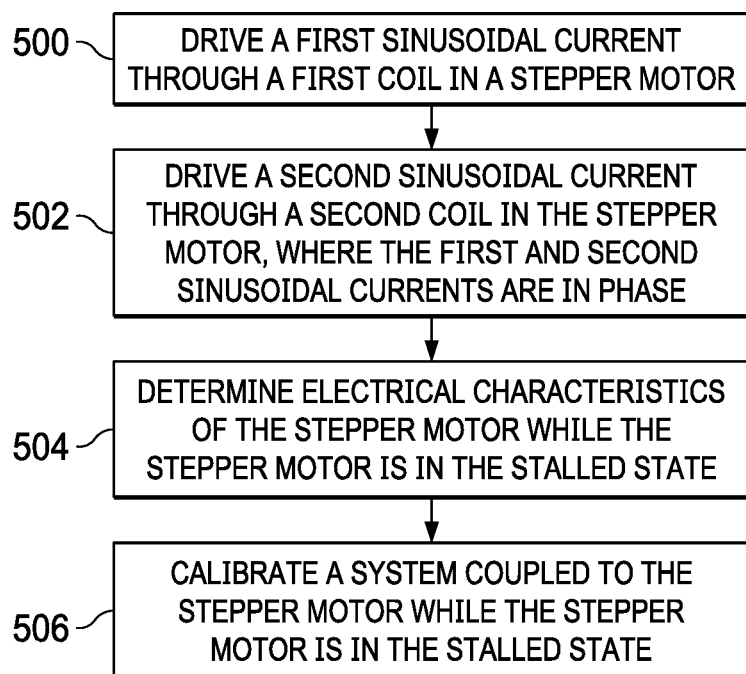
FIG. 5 illustrates a method of electrically producing a stalled state in a stepper motor in an example implementation.

FIG. 5 illustrates a method of electrically producing a stalled state in a stepper motor in an example implementation. In this example, stepper motor driver 120 drives a first sinusoidal current through coil A 141 in stepper motor 130, (operation 500). Stepper motor driver 120 includes power transistor elements in a half-bridge arrangement coupled to the A+ 121 and A− 122 terminals of coil A 141. Stepper motor driver 120 is configured to selectively switch current for coil A 141 of stepper motor 130 according to control signals from control circuitry 110 applied to corresponding gate terminals of power transistor elements within stepper motor driver 120.

Stepper motor driver 120 also drives a second sinusoidal current through coil 140 in stepper motor 130, where the first and second sinusoidal currents are in phase, (operation 502).

Stepper motor driver 120 includes power transistor elements in a half-bridge arrangement coupled to the B+ 123 and B− 124 terminals of coil B 140. Stepper motor driver 120 is configured to selectively switch current for coil B 140 of stepper motor 130 according to control signals from control circuitry 110 applied to corresponding gate terminals of power transistor elements within stepper motor driver 120.

Since the sinusoidal currents applied to coil A 141 and coil B 140 are in phase, the stepper motor does not turn and is in a stalled state. This allows the stepper motor to be driven with the same current profile as the motor has while running, but does not move the motor or create back-EMF. This stalled state of the motor mimics a mechanical stall of the motor and provides the control circuitry with an opportunity to determine the electrical characteristics of the stalled motor.

Optionally, control circuitry 110 determines electrical characteristics of stepper motor 130 while the stepper motor is in the stalled state, (operation 504). In an example, control circuitry 110 determines electrical characteristics of stepper motor 130 while other examples rely upon external circuitry (such as test equipment applied by a technician) to determine electrical characteristics of stepper motor 130. In other examples, mechanical characteristics of stepper motor 130 are determined while the stepper motor is in the stalled state.

Also, optionally, control circuitry 110 calibrates a system coupled to stepper motor 130 while the stepper motor is in the stalled state, (operation 506). As discussed above, with respect to the electrical characteristics of stepper motor 130, in an example, control circuitry 110 calibrates a system coupled to stepper motor 130 while other examples rely upon external circuitry (such as test equipment applied by a technician) to calibrate a system coupled to stepper motor 130. In an example, this system is the entire electro-mechanical system coupled to stepper motor 130, while in other examples, this system is a portion of the electro-mechanical system coupled to stepper motor 130.

What is claimed is:

1. A method for determining electrical characteristics of stepper motor, the method comprising:
   driving a first sinusoidal current through a first coil; and
   driving a second sinusoidal current through a second coil;
   wherein the first and second sinusoidal currents are in phase;
   wherein the stepper motor stalls while driving the first sinusoidal current through the first coil and while driving the second sinusoidal current through the second coil; and
   determining the electrical characteristics of the stepper motor while the stepper motor is stalled.

2. The method of claim 1 wherein the first and second sinusoidal currents are produced by power transistor elements in a half-bridge arrangement configured to selectively switch current for the first and second coils according to control signals applied to corresponding gate terminals of the power transistor elements.

3. The method of claim 2, wherein the control signals are produced by control circuitry configured to apply the control signals to the gate terminals of the power transistor elements to control the power transistor elements to produce in-phase sinusoidal currents within the first and second coils.

4. The method of claim 2, wherein the power transistor elements are n-channel power metal oxide semiconductor field-effect transistors (MOSFETs).

5. The method of claim 2, wherein each coil is driven by a pair of power transistor elements in a half-bridge arrangement.

6. The method of claim 1, further comprising:
driving the same sinusoidal current through the first coil and the second coil.

7. The method of claim 1, wherein the first and second sinusoidal currents each comprise a plurality of micro-steps.

8. The method of claim 7, further comprising:
driving the same current through the first coil and the second coil in each of the plurality of micro-steps.

9. A motor control circuit for determining electrical characteristics of a stepper motor, comprising:
power transistor elements in a half-bridge arrangement coupled to first and second terminals of first and second coils, configured to selectively switch current for the first and second coils of the stepper motor according to control signals applied to corresponding gate terminals; and
control circuitry coupled to the gate terminals of the power transistor elements, configured to produce the control signals to control the power transistor elements, wherein the control signals are configured to cause the power transistor elements to drive a first sinusoidal current through the first coil and a second sinusoidal current through the second coil; wherein the first and second sinusoidal currents are in phase;
wherein the stepper motor stalls while driving the first sinusoidal current through the first coil and while driving the second sinusoidal current through the second coil; and
wherein the electrical characteristics of the stepper motor are determined while the stepper motor is stalled.

10. The motor control circuit of claim 9, wherein the power transistor elements are n-channel power metal oxide semiconductor field-effect transistors (MOSFETs).

11. The motor control circuit of claim 9, wherein the control circuitry is configured to drive the same sinusoidal current through the first coil and the second coil.

12. The motor control circuit of claim 9, wherein the first and second sinusoidal currents each comprise a plurality of micro-steps.

13. The motor control circuit of claim 12, wherein the control circuitry is configured to drive the same current through the first coil and the second coil in each of the plurality of micro-steps.

* * * * *